United States Patent
Stahl

(10) Patent No.: US 6,546,988 B2
(45) Date of Patent: Apr. 15, 2003

(54) WINDOW SUSPENSION FOR VEHICLE SOFT TOP

(76) Inventor: James R. Stahl, 828 Hayes Cir., Huntington Beach, CA (US) 92646

( * ) Notice: Subject to any disclaimer, the term of this patent is extended or adjusted under 35 U.S.C. 154(b) by 0 days.

(21) Appl. No.: 10/016,480

(22) Filed: Oct. 30, 2001

(65) Prior Publication Data

US 2002/0100563 A1 Aug. 1, 2002

Related U.S. Application Data

(63) Continuation of application No. 09/592,631, filed on Jun. 13, 2000, now Pat. No. 6,338,223.

(51) Int. Cl.$^7$ .......................... E06B 1/00; E05C 21/00; B60J 1/00
(52) U.S. Cl. ................ 160/87; 160/368.1; 160/DIG. 8; 52/63; 52/208; 49/463; 135/117; 296/145; 296/146.15
(58) Field of Search .......................... 49/463, 465, 466; 135/117; 296/107.07, 145, 146.14, 146.15, 146.16; 52/171.1, 63, 208, 222; 160/87, 368.1, 354, DIG. 8

(56) References Cited

U.S. PATENT DOCUMENTS

| | | |
|---|---|---|
| 1,074,297 A | 9/1913 | Sedlack |
| 1,109,475 A * | 9/1914 | Sipperley |
| 1,356,389 A | 10/1920 | Morse |
| 1,368,166 A | 2/1921 | Krick et al. |
| 1,414,399 A | 5/1922 | Dwyer |
| 1,418,539 A | 6/1922 | De Broeck |
| 1,474,166 A | 11/1923 | Roberts |
| 1,583,234 A | 5/1926 | Loud |
| 1,583,917 A | 5/1926 | Donnelly |
| 1,671,059 A | 5/1928 | Calpin |
| 2,279,572 A * | 4/1942 | Kann |
| 3,188,135 A | 6/1965 | Bernstein et al. |
| 3,259,127 A | 7/1966 | Klinger et al. |
| RE31,328 E * | 8/1983 | anderson et al. |
| 5,040,844 A * | 8/1991 | Stolz et al. |
| 5,271,655 A * | 12/1993 | Ball et al. |
| 6,015,181 A | 1/2000 | Exher |
| 6,338,223 B1 * | 1/2002 | Stahl ............................ 49/463 |

FOREIGN PATENT DOCUMENTS

GB          188582           1/1922

* cited by examiner

Primary Examiner—Robert Canfield
(74) Attorney, Agent, or Firm—Knobbe, Martens, Olson & Bear, LLP

(57) ABSTRACT

There is disclosed a system for suspending a rigid panel in an opening formed in a barrier structure. The system comprises a sleeve of flexible material having an anchor portion attachable to the perimeter of the opening and a grip portion opposite the anchor portion. The grip portion is contoured so as to form a channel disposed between an anterior extension and a posterior extension of the grip portion. Each of the anterior extension and the posterior extension comprises a fold of the flexible material having an apex at its inner end. A first elongated tensioning member received within the apex of the anterior extension and a second elongated tensioning member received within the apex of the posterior extension. The edges of the panel are received within the channel and the first and second elongated tensioners may be made sufficiently taut to prevent easy removal of the panel from the channel. Also disclosed is a method of suspending a rigid panel in a barrier structure employing structure as disclosed.

13 Claims, 5 Drawing Sheets

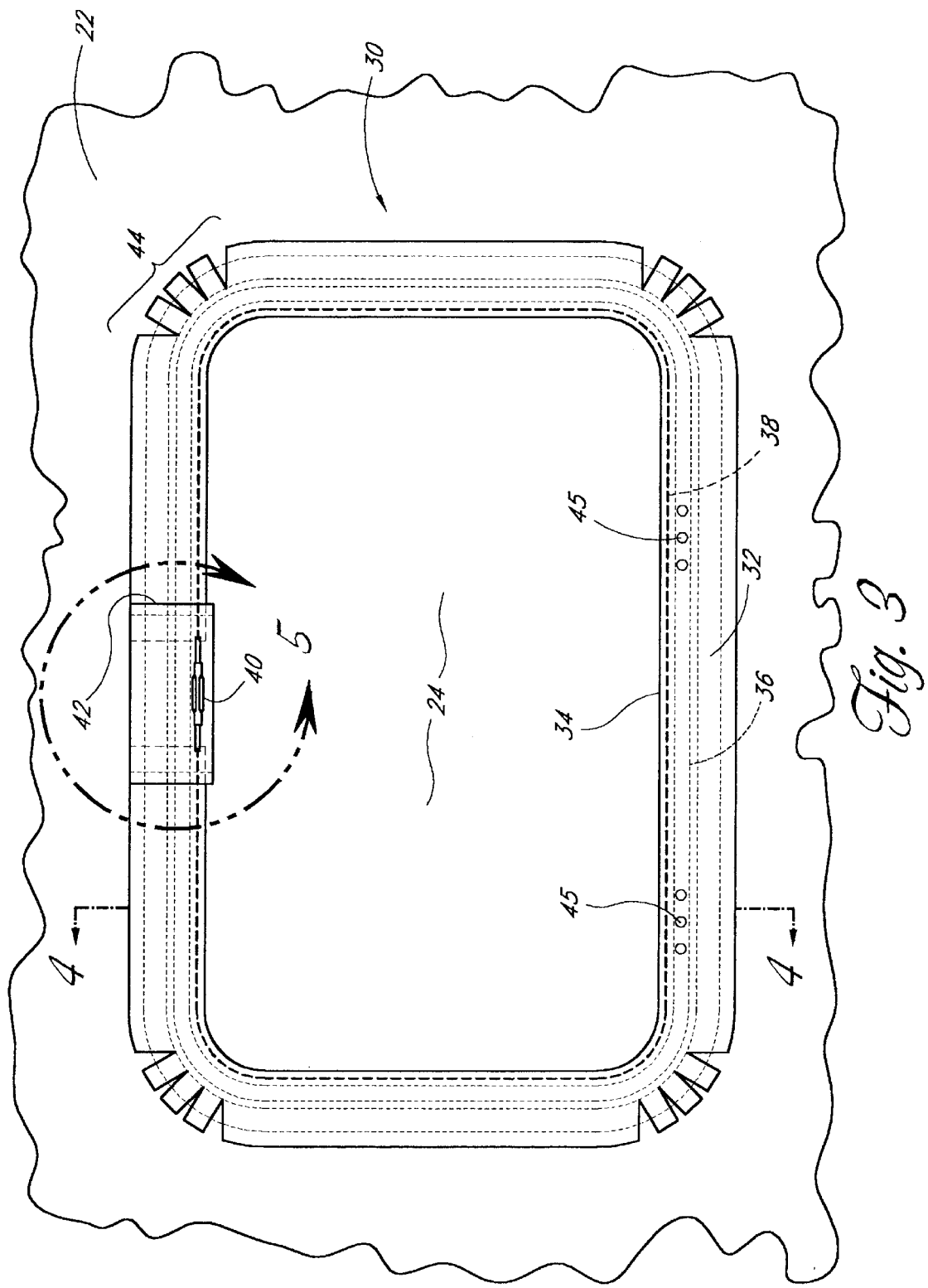

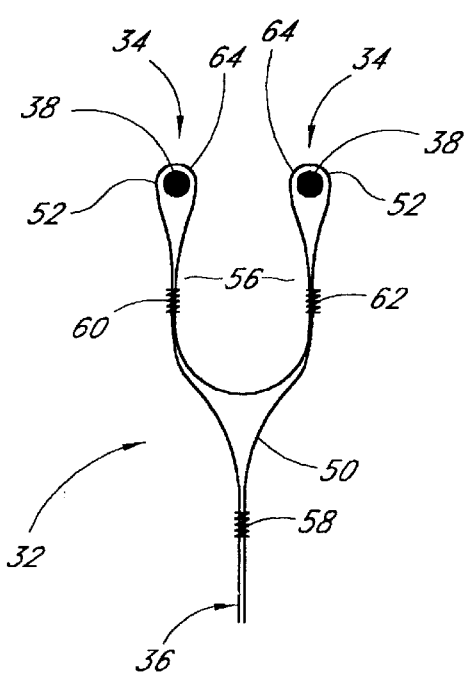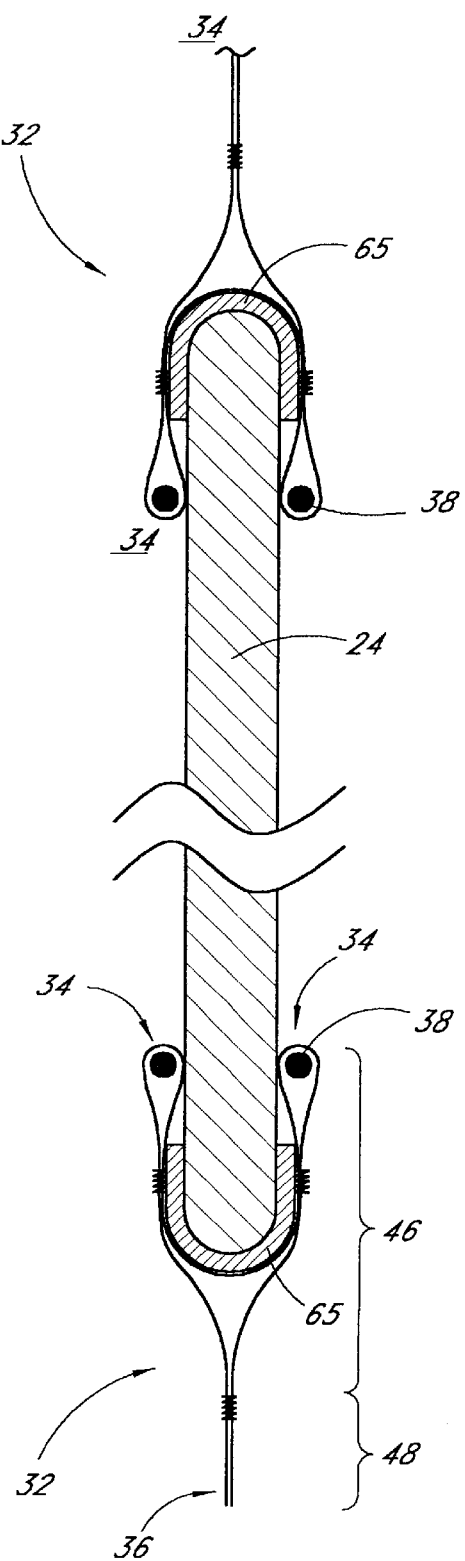
Fig. 4B
Fig. 4A

WINDOW SUSPENSION FOR VEHICLE SOFT TOP

RELATED APPLICATIONS

This application is a continuation of prior application Ser. No. 09/592,631, filed Jun. 13, 2000, now U.S. Pat. No. 6,338,223 titled WINDOW SUSPENSION FOR VEHICLE SOFT TOP.

BACKGROUND OF THE INVENTION

1. Field of the Invention

The present invention relates generally to soft or folding structures and more particularly to a device and method for securely attaching a rigid panel or window to a vehicle soft top or other similar structure.

2. Description of the Related Art

In the construction of soft convertible tops for automobiles or other vehicles such as boats or in the construction of "soft" static structures such as tents, it is often necessary to attach a window made of glass or other rigid material such as Plexiglas to a main structure of fabric or some other flexible material. It is currently known to use gluing or other substantially permanent techniques to attach the window directly to the soft top. Another known technique is to provide a metal frame to hold the window and then glue the metal frame to the soft top. These methods have certain limitations in that replacement of the entire top is often required when the window either breaks or works loose from its position in the top over the years, as the top is raised and lowered many times. Replacement of a window when using currently known mounting techniques is thus frequently time consuming, expensive, and wasteful. In addition, currently known window mountings do not permit the user to tighten the mounting to better secure and/or seal a loosened window.

SUMMARY OF THE INVENTION

In accordance with one preferred embodiment of the invention, there is provided a system for suspending a rigid panel in an opening formed in a barrier structure. The system comprises a sleeve of flexible material having an anchor portion attachable to the perimeter of the opening and a grip portion opposite the anchor portion. The grip portion is contoured so as to form a channel disposed between an anterior extension and posterior extension of the grip portion. Each of the anterior extension and the posterior extension comprises a fold of the flexible material having an apex at its inner end. A first elongated tensioning member received within the apex of the anterior extension and a second elongated tensioning member is received within the apex of the posterior extension. The edges of the panel are receivable within the channel and the first and second elongated tensioning members may be made sufficiently taut to prevent easy removal of the panel from the channel.

In accordance with another preferred embodiment of the invention, there is provided a barrier structure which comprises a generally flexible wall having an opening, a sleeve of flexible material having an anchor portion attached to the perimeter of the opening and grip portion opposite the anchor portion. The grip portion is contoured so as to form a channel disposed between an anterior extension and a posterior extension of the grip portion. Each of the anterior extension and the posterior extension comprises a fold of the flexible material having an apex at its inner end, a first elongated tensioning member received within the apex of the anterior extension and a second elongated tensioning member received within the apex of the posterior extension. The barrier structure also has a panel structure. The edges of the panel structure are received within the channel and the first and second elongated tensioning members are sufficiently taut to prevent easy removal of the panel structure from the channel.

In accordance with yet another preferred embodiment of the invention, there is provided a method for suspending a rigid panel in a barrier structure. The method comprises the steps of attaching an anchor portion of a sleeve of flexible material to the perimeter of the opening. The sleeve also has a grip portion opposite the anchor portion. The grip portion is contoured so as to form a channel disposed between an anterior extension and a posterior extension of the grip portion. Each of the anterior extension and the posterior extension comprises a fold of the flexible material having an apex at its inner end. The method also comprises providing a first elongated tensioning member within the apex of the anterior extension and a second elongated tensioning member within the apex of the posterior extension, placing the panel in relation to the sleeve such that the edges of the panel are received within the channel, and tensioning the first and second elongated members sufficiently to prevent easy removal of the panel from the channel.

For purposes of summarizing the invention and the advantages achieved over the prior art, certain objects and advantages of the invention have been described hereinabove. Of course it is to be understood that not necessarily all such objects or advantages may be achieved in accordance with any particular embodiment of the invention. Thus, for example one skilled in the art will recognize that the invention may be embodied or carried out in a manner that achieves or optimizes one advantage or group of advantages as taught herein without necessarily achieving other objects or advantages as may be taught or suggested herein.

All these embodiments are intended to be within the scope of the invention herein disclosed. These and other embodiments of the present invention will become readily apparent to those skilled in the art from the following description of the preferred embodiments having reference to the attached figures. The invention not being limited to any particular preferred embodiment(s) disclosed.

BRIEF DESCRIPTION OF THE DRAWINGS

Having thus summarized the general nature of the invention and its essential features and advantages, certain preferred embodiments and modifications thereof will become apparent to those skilled in the art from the detailed description here and having reference to the figures that follow, of which:

FIG. 3 is a side elevation view of another soft top portion employing a window suspension in accordance with the invention;

FIG. 4A is a cross-section view of a window suspension in accordance with the invention;

FIG. 4B is a detailed view of the cross section of the window grip portion of the window suspension;

DETAILED DESCRIPTION OF THE PREFERRED EMBODIMENTS

Figure 1:
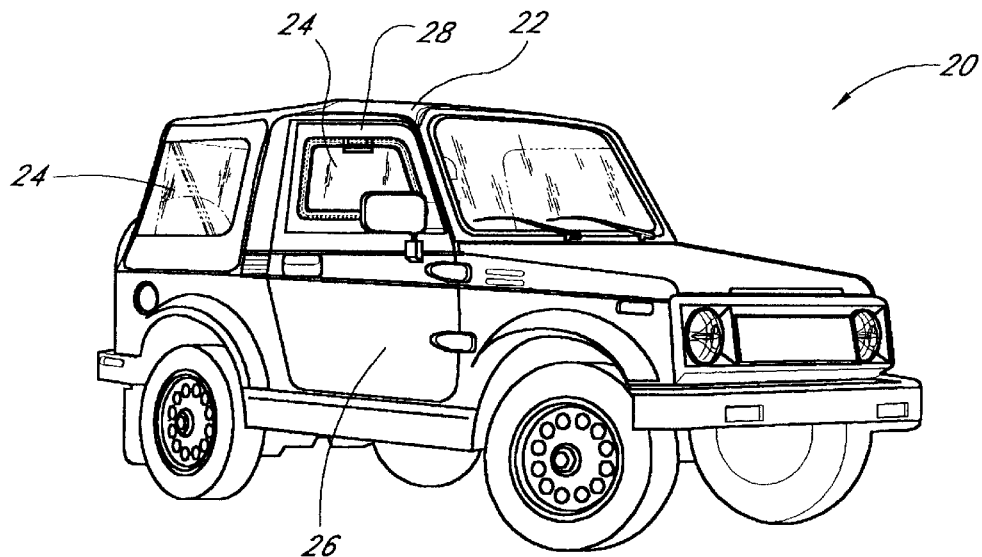
FIG. 1 is a perspective view of a vehicle having a soft convertible top employing a window suspension in accordance with the present invention.
Figure 2:
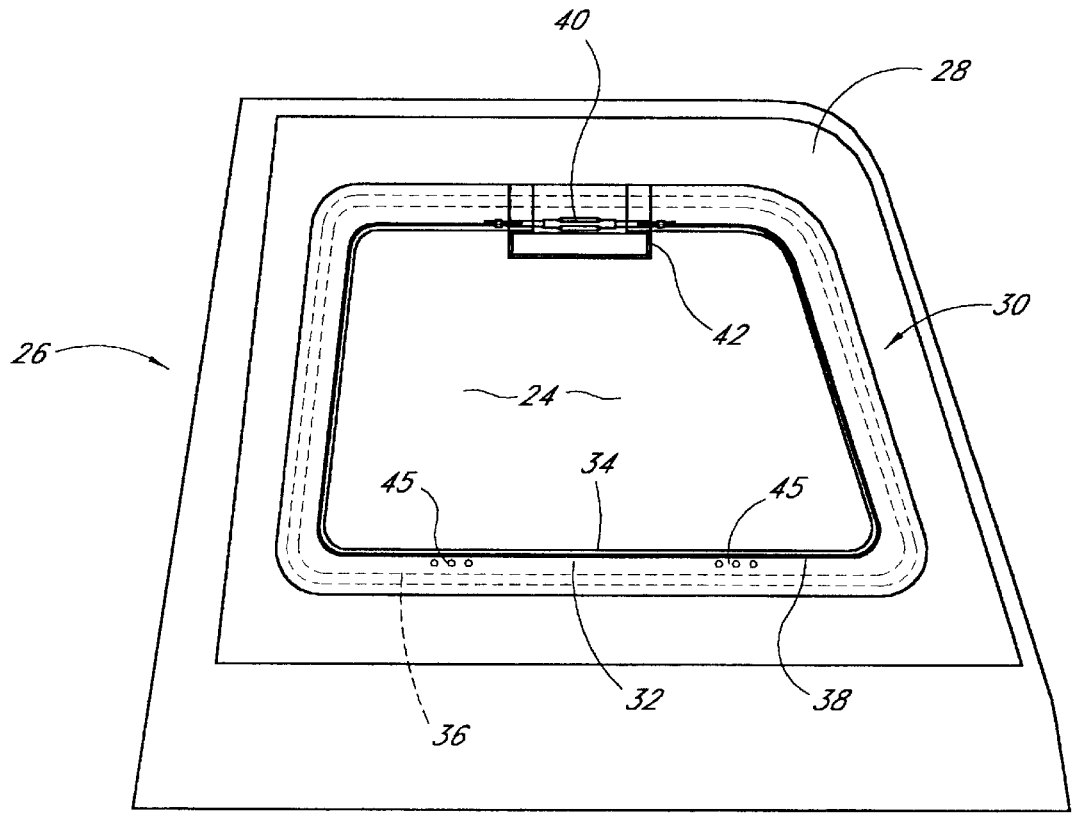
FIG. 2 is a side elevation view of a soft side portion employing a window suspension in accordance with the invention.

The system of the present invention will be described and its use exemplified in the context of an automotive soft top as illustrated in FIG. 1. The system is particularly desirable for convertible automotive tops. It will be understood, however, that the invention described and claimed herein may be used in connection with many types of barrier structures having at least one "soft" portion including, but not limited to, soft tops for boats, folding travel trailers, tents, porch coverings, and the like. Consequently the description which follows should not be considered as limited only to automobiles.

FIG. 1 shows a vehicle 20 having a soft top or convertible top 22 enclosing the passenger area. Typically, the soft top 22 may be folded into or deployed on the vehicle 20 either by hand or an automated mechanism (not shown). When in the deployed or erected position as shown in FIG. 1, the soft top 22 serves as a weatherproof enclosure for the vehicle's passengers, fulfilling substantially the same role as a steel hard top. However the soft top, being retractable or removable, enables the vehicle user to select between an open and an enclosed vehicle at any time. The soft top 22 is generally constructed of canvas, leather, rubber or some other relatively lightweight, durable, flexible material.

The soft top 22 usually has a number of windows 24. The windows 24 are usually constructed of a soft flexible material such as clear vinyl, but for best optical performance the windows 24 usually comprise a generally flat panel of a rigid material such as safety glass, Lexan or Plexiglas. As seen in FIG. 1, the vehicle 20 may have one or more removable doors 26 which have a soft side portion 28 constructed from a flexible material similar to that used to make the soft top 22. The soft side portion 28 also mounts a window 24 and can make the removable door 26 lighter and easier to handle. Furthermore, the soft side portion 28 (together with its window 24) may itself be removable from the door 26 or folded down as a further option for providing an open passenger compartment for the vehicle 20.

FIGS. 2, 3, 4A and 4B show a preferred embodiment of a window suspension 30 which may be used to mount the window 24 in the soft side portion 28. However, it will be appreciated that the suspension 30 can be used to mount the window in other portions of the soft top 22, such as the rear or even on the roof. The window suspension 30 comprises a window grip 32, preferably formed from a flexible, durable material such as canvas or other high-strength fabric, which surrounds the perimeter of the window 24 and holds the edges of the window 24 between two layers or extensions 52, 54 (best seen in FIG. 4B). Each extension 52, 54 comprises a fold of the material making up the grip 32, and forms an apex 64 at an inner edge 34, opposite an outer edge 36 of the grip 32. A cable 38, made of stainless steel, nylon, kevlar, or other suitable material, is disposed within each extension 52, 54 of the window grip 32 near the apex 64. Each cable 38 is tensioned by use of a turnbuckle 40 or some other tensioning device, and applies tension to the inner edge 34 of the grip 32 in a manner which tends to contract the perimeter of the grip 32 at the inner edge 34, i.e. in the manner of a drawstring. Thus, under the tension of the cables 38 each extension 52, 54 is drawn tightly against the corresponding face of the window 24, the edges of which are thereby firmly retained between the extensions 52, 54.

A cover flap 42 is provided to permit selective access to the turnbuckle 40 as seen in FIG. 3. When the turnbuckle 40 is not in use, the end of the cover flap 42 may be tucked under the window grip 32 so as to promote a neat appearance for the window suspension 30. In addition, the window grip 32 may have a series of cutouts 44 at its corners to facilitate proper attachment of the grip 32 to the soft side portion 28 or other part of the soft top 22. To permit accumulated moisture to drain from the window grip 32 a number of drain holes 45 may be cut into the either of the extensions 52, 54.

FIGS. 4A and 4B show a cross-section of the window suspension system 30 along the line 4—4 in FIG. 3. The window grip 32 has a grip portion 46 which receives the window 24 as described above, an anchor portion 48 which is bonded to the soft side portion 28 or any other part of the soft top 22 by stitching, gluing, or other suitable attachment. As best seen in FIG. 4B, the window grip 32 is preferably formed from a sleeve 50 of the window grip material which is folded back upon itself several times to form an anterior extension 52 and a posterior extension 54. The two extensions form a channel 56 therebetween, that receives the edges of the window 24. Thus the anchor portion 48 and the grip portion 46 of the window grip 32 attain a Y-shaped cross section suitable for holding the window 24 and attaching to the soft top 22. To retain this Y configuration, the window grip 32 is preferably bonded, by stitching, gluing, or other suitable techniques, at an anchor bond 58 on the anchor portion 48, and an anterior bond 60 and a posterior bond 62 on the anterior and posterior extensions 52, 54, respectively. Thus bonded, the window grip 32 will maintain its shape (especially as regards the relative lengths of the extensions 52, 54) if the cables 38 are unevenly tensioned with respect to each other, as is often the case when replacing the window 24. A gasket 65 of rubber or other suitable material may be placed between the window 24 and the window grip 32 to provide a substantially weatherproof, fluid-tight seal.

Figure 5:
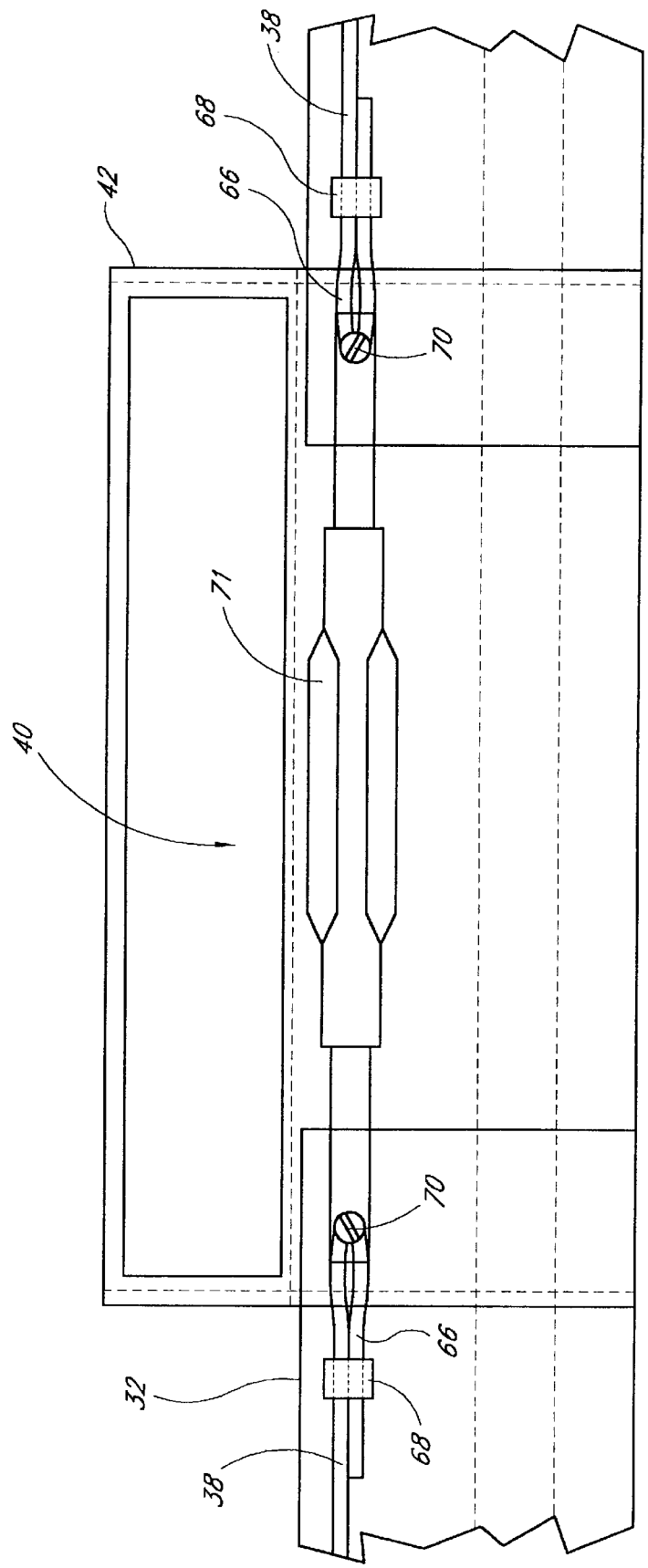
FIG. 5 is a detailed view of a first type of tensioning device used with the window suspension.

FIG. 5 shows the preferred arrangement of the cable 38, turnbuckle 40 and cover flap 42 in greater detail. The cable 38 may be attached to either end of the turnbuckle 40 via a loop 66 that is formed at either end of the cable and fastened with a cable crimp 68. A screw 70 or other suitable fastener may be used to connect the loop 66 to either end of the turnbuckle 40. Alternatively, the cable can be crimped directly into either end of the turnbuckle 40. With the cable 38 connected to both ends of the turnbuckle 40, the user can tighten or loosen the cable by operating the main bolt 71 of the turnbuckle 40 to draw the ends of the turnbuckle 40 together or push them apart. Thus the turnbuckle 40 is suitable for removing/replacing the window 24 entirely, or tightening the cable 38 and grip 32 as needed from time to time. The cover flap 42 lays over the turnbuckle 40 and may be tucked under the grip portion or the window grip 32 to promote a neat appearance.

Figure 6:
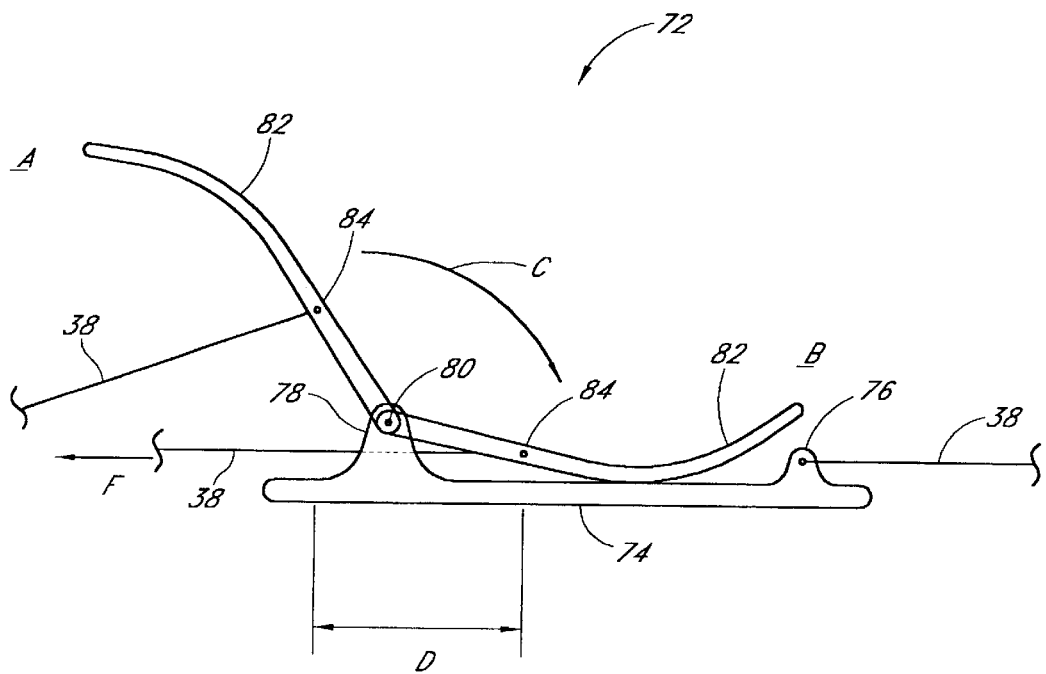
FIG. 6 is a schematic view of a quick release tensioner for use with the window suspension.

FIG. 6 shows a quick release tensioner 72 which may be used as an alternative to the turnbuckle 40, for applying tension to the cable 38. The quick release tensioner 72 preferably has a generally rigid base 74 having a cable attachment 76 at one end and a hinge support 78 opposite the cable attachment 76. The hinge support 78 cooperates with an axle 80 to pivotally attach a quick release lever 82 to the base 74. The quick release lever 82 may rotate as necessary on the axle 80 between a loosened position A and a tensioned position B against the base 74, in the direction marked by the arrow C. The cable 38 is attached to the quick release lever 82 at a point 84 between the axle 80 and the end of the quick release lever 82. When the user rotates the quick release lever 82 from the loosened position A to the tensioned position B, the cable 38 is stretched by a tension distance D, applying the necessary tension to the cable 38. The tension in the cable 38 holds the quick release lever 82 in the tensioned position B against the base 74, as in the tensioned position B the attachment point 84 of the cable 38 is located on a side of the axle 80 adjacent the base 74. This arrangement of the attachment point 84 and axle 80 causes the quick release handle to press firmly against the base 74 under a tension F in the cable 38. To permit occasional tightening of the cable 38 and grip 32, the cable attachment 76 may comprise a threaded fitting that allows lateral movement of an endpoint of the cable 38 as is done at either end of the turnbuckle 40.

As described above the suspension system permits quick, easy mounting or replacement of a window 24 in the soft top 22. To replace the window 24, the user operates the turnbuckle 40, quick release tensioner 72, or other tensioning device to loosen one or both of the cables 38. Upon loosening the cable(s) 38, one or both of the extensions 52, 54 becomes sufficiently slack to permit easy removal of the edges of the window 24 from the channel 56 between the extensions. After removing the original window 24, the user can then place a second window in the channel 56 and apply a tension to the cable(s) 38 by using any of the tensioning devices detailed above, to securely retain the window in the grip 32.

Those skilled in the art will recognize that the invention is not limited to the mounting of windows in a "soft" barrier structure. Rather, the invention is equally useful for mounting many other substantially flat, rigid panel-like structures, such as a screen or a sheet of clear vinyl having a substantially rigid perimeter frame, or an opaque or translucent decorative or protective panel made of stiff plastic, stained glass, wood, metal, or the like.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above, but should be determined only by a fair reading of the claims that follow.

What is claimed is:

1. A system for suspending a rigid panel in an opening formed in a barrier structure, the system comprising:
   a grip portion formed from flexible material and located at the perimeter of the opening, said grip portion forming a channel disposed between an anterior extension and a posterior extension of the grip portion; and
   a first elongated tensioning member received within the anterior extension;
   wherein the edges of the panel are receivable within the channel and the first elongated tensioning member may be made sufficiently taut to prevent easy removal of the panel from the channel.

2. The system of claim 1, further comprising a second elongated tensioning member received within the posterior extension, wherein the second elongated tensioning member may be made sufficiently taut to prevent easy removal of the panel from the channel.

3. The system of claim 2, wherein at least one of the first elongated tensioning member and the second elongated tensioning member comprises a cable.

4. The system of claim 2, wherein at least one of said first tensioning member and said second tensioning member may be made taut independently of the other of said first tensioning member end said second tensioning member.

5. The system of claim 1, further comprising a tensioning device operatively connected to said first tensioning member.

6. The system of claim 5, wherein said tensioning device comprises a quick-release lever.

7. The system of claim 5, wherein said tensioning device comprises a turnbuckle.

8. The system of claim 2, further comprising at least one tensioning device operatively connected to at least one of said first tensioning member and said second tensioning member.

9. A barrier structure comprising:
   a generally flexible wall having an opening;
   a grip portion formed from flexible material and located at the perimeter of the opening, said grip portion forming a channel disposed between an anterior extension and a posterior extension of the grip portion;
   a first elongated tensioning member received within the anterior extension; and
   a panel structure;
   wherein the edges of the panel structure are received within the channel and the first elongated tensioning member can be made sufficiently taut to prevent easy removal of the panel from the channel.

10. The system of claim 9, further comprising a tensioning device operatively connected to said first tensioning member.

11. The system of claim 9, further comprising a second elongated tensioning member received within the posterior extension, wherein the second elongated tensioning member may be made sufficiently taut to prevent easy removal of the panel from the channel.

12. The system of claim 11, further comprising at least one tensioning device operatively connected to at least one of said first tensioning member and said second tensioning member.

13. The system of claim 11, wherein at least one of said first tensioning member and said second tensioning member may be made taut independently of the other of said first tensioning member and said second tensioning member.

* * * * *

UNITED STATES PATENT AND TRADEMARK OFFICE
CERTIFICATE OF CORRECTION

PATENT NO. : 6,546,988 B2
DATED : April 15, 2003
INVENTOR(S) : James R. Stahl

It is certified that error appears in the above-identified patent and that said Letters Patent is hereby corrected as shown below:

<u>Column 6,</u>
Line 4, please replace "member end said" with -- member and said --

Signed and Sealed this

First Day of June, 2004

JON W. DUDAS
*Acting Director of the United States Patent and Trademark Office*